United States Patent [19]

Berglund

[11] Patent Number: 5,117,430
[45] Date of Patent: May 26, 1992

[54] APPARATUS AND METHOD FOR COMMUNICATING BETWEEN NODES IN A NETWORK

[75] Inventor: Neil C. Berglund, Kasson, Minn.

[73] Assignee: International Business Machines Corporation, Armonk, N.Y.

[21] Appl. No.: 652,760

[22] Filed: Feb. 8, 1991

[51] Int. Cl.[5] ............................................. H04J 3/14
[52] U.S. Cl. ............................ 370/85.1; 340/825.02; 340/825.06; 370/94.3
[58] Field of Search ............... 370/94.3, 85.1, 85.2, 370/85.3, 85.9, 85.8, 95.2; 340/825.02, 825.5, 825.51, 825.06, 825.08

[56] References Cited

U.S. PATENT DOCUMENTS

| | | | |
|---|---|---|---|
| 4,199,662 | 4/1980 | Lowe, Jr. ............................ | 370/85.8 |
| 4,271,505 | 6/1981 | Menot et al. ........................ | 370/85.3 |
| 4,412,326 | 10/1983 | Limb .................................... | 370/85.3 |
| 4,635,195 | 1/1987 | Jeppesen, III et al. ............. | 364/200 |
| 4,695,946 | 9/1987 | Andreasen et al. ................. | 364/200 |
| 4,701,845 | 10/1987 | Andreasen et al. ................. | 364/200 |
| 4,763,329 | 8/1988 | Green .................................. | 340/825.02 |
| 4,858,222 | 8/1989 | Weimert et al. ................... | 340/825.5 |
| 4,910,666 | 3/1990 | Nibby, Jr. et al. ................. | 364/200 |

*Primary Examiner*—Douglas W. Olms
*Assistant Examiner*—Russell W. Blum
*Attorney, Agent, or Firm*—Roy W. Truelson

[57] ABSTRACT

A plurality of nodes in a network are connected in a tree arrangement. A master control node is at the root of the tree. Each connection between a parent node and a child node in the tree consists of only one pair of wires, over which data bits are transmitted serially. To avoid contention, communications are always initiated by the parent node. The child node detects the end of message when no more data is received for a set timeout period. The child node then has a specified time interval for response to the communication, during which interval it has control of the line. After the end of the interval, control reverts to the parent. If a message has been received from the child within that time, normal status is resumed; otherwise, the parent retries the message or takes other error recovery actions. In the preferred embodiment, the network is used to monitor power conditions at a plurality of nodes in a computer system.

23 Claims, 18 Drawing Sheets

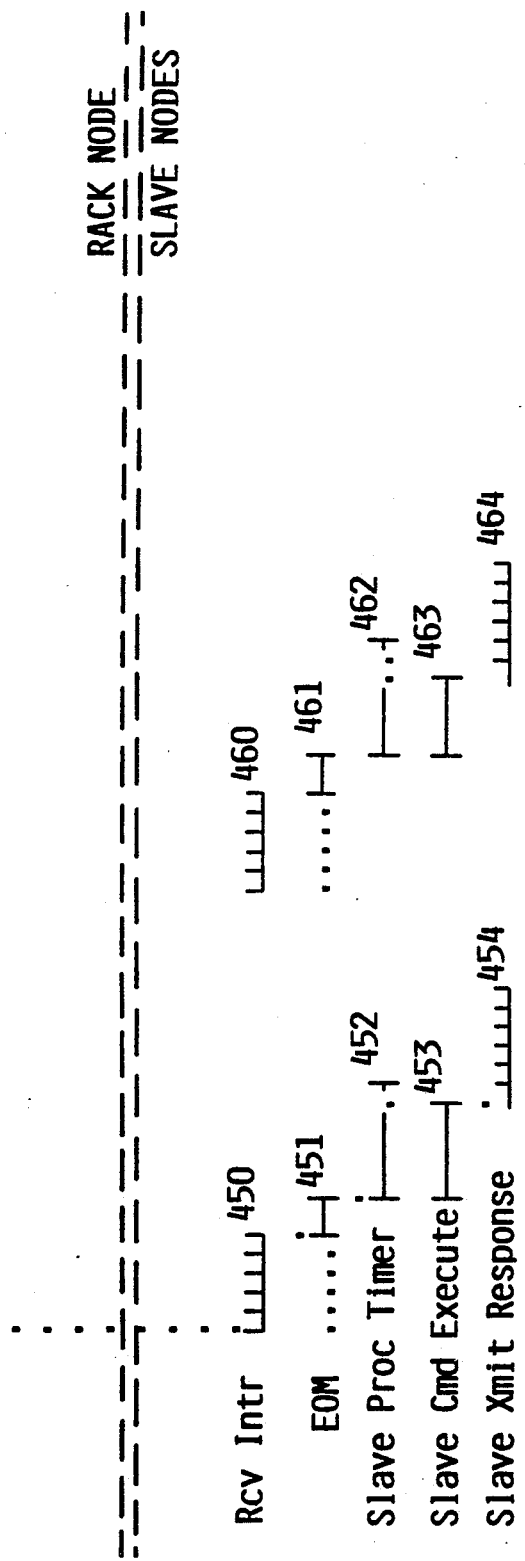
FIG. 4A₂

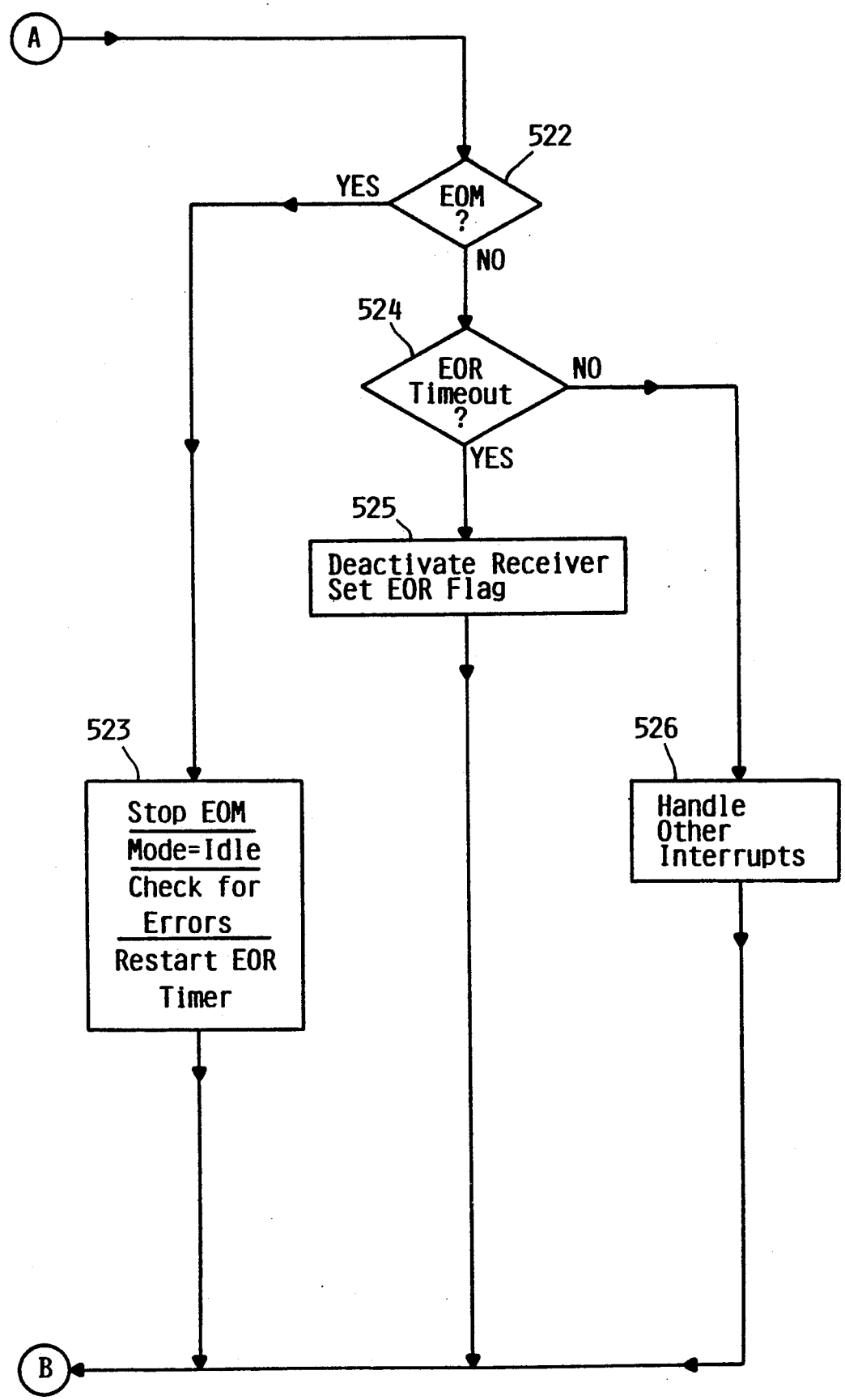
FIG. 5B₂

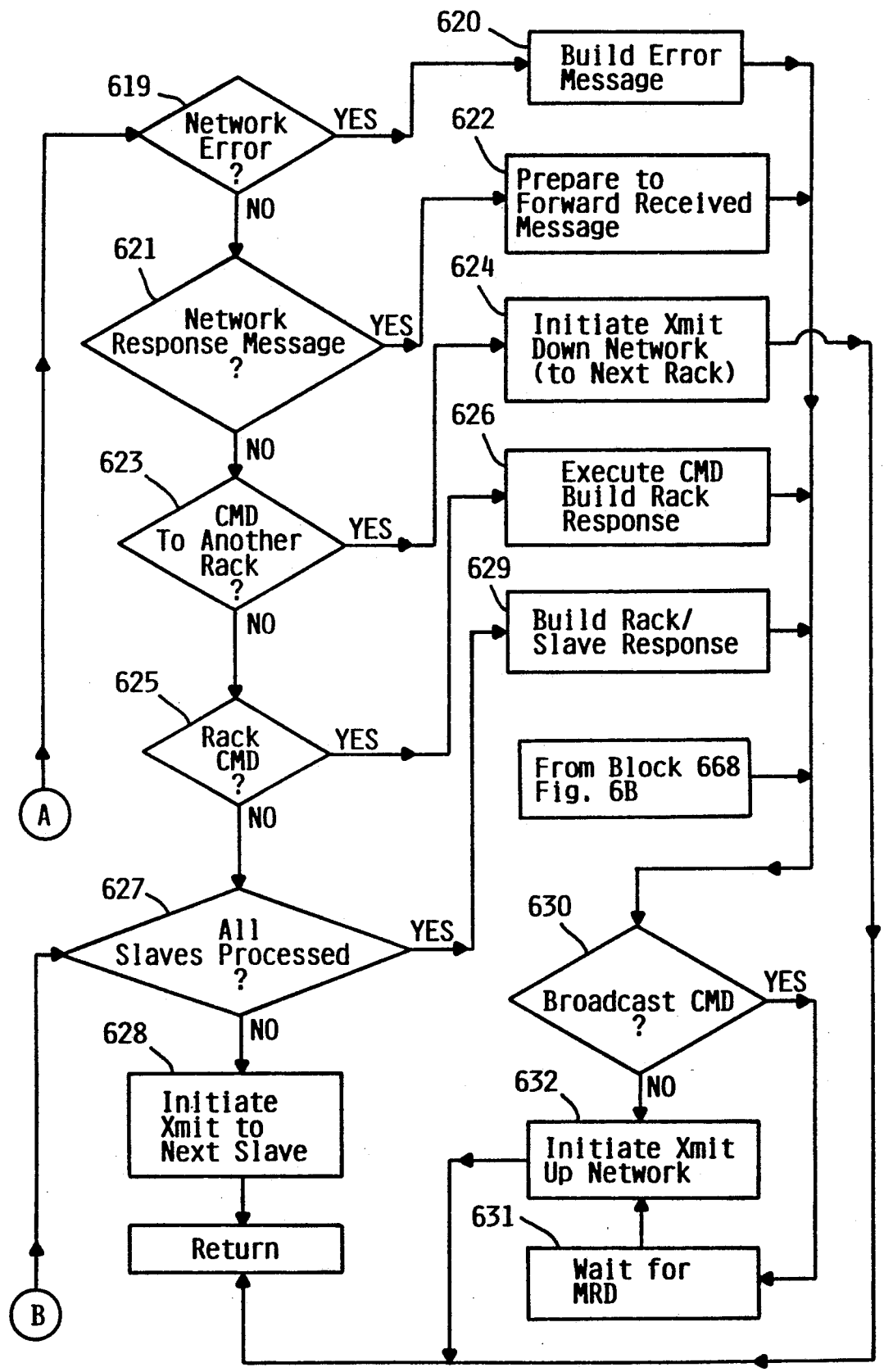
FIG. 6A₂

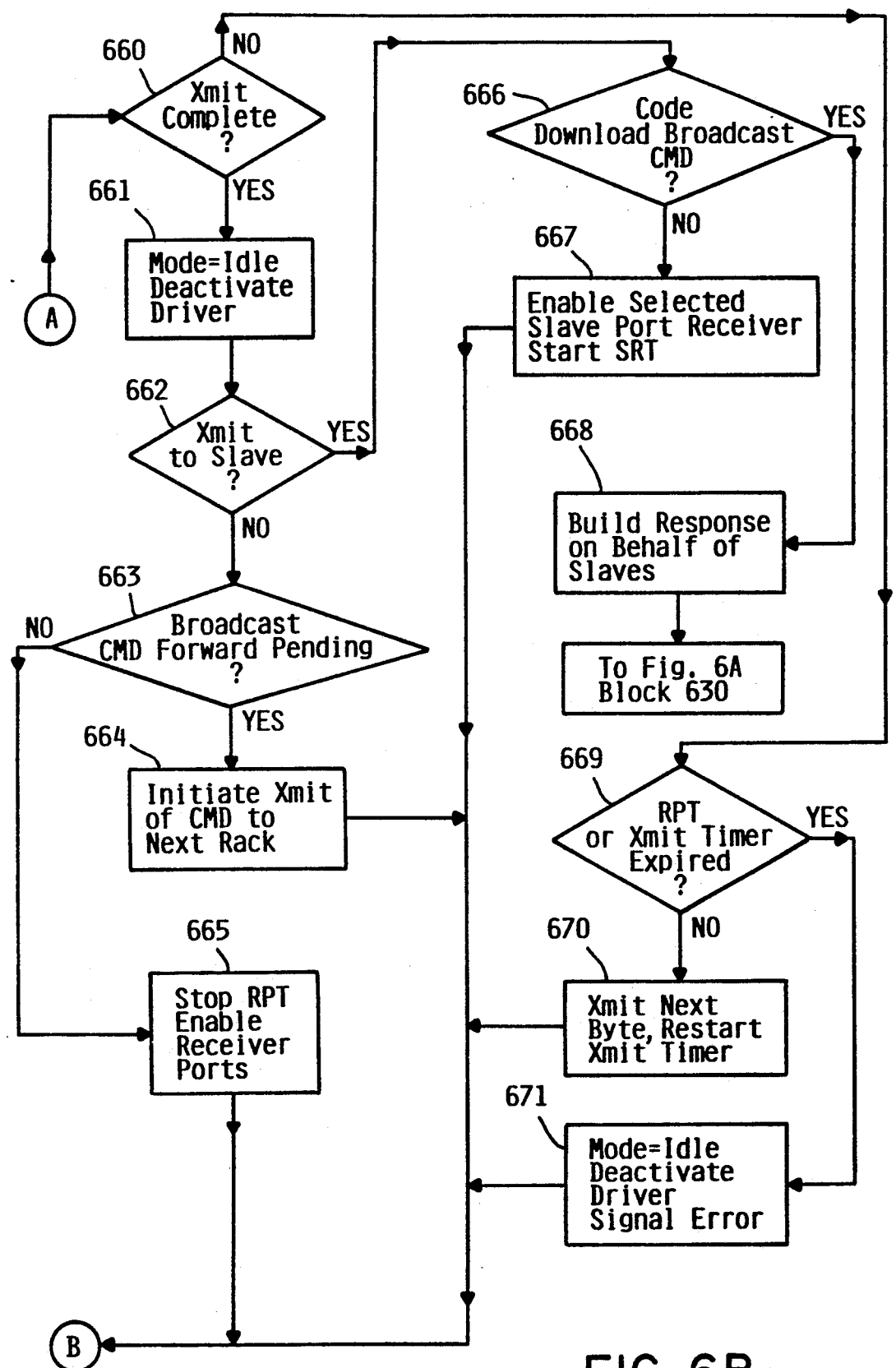
FIG. 6B₂

APPARATUS AND METHOD FOR COMMUNICATING BETWEEN NODES IN A NETWORK

FIELD OF THE INVENTION

The present invention relates to computer communications, and in particular to a reduced cost serial communications protocol for communicating between nodes in a network.

BACKGROUND OF THE INVENTION

Modern computer systems support communications at many different levels. An individual computer comprises a variety of different processors communicating with each other. A single central processing unit (CPU) is typically the basic workhorse of the computer, but other processors control disk storage devices, printers, terminals, communications with other computers, etc. Even more remote and primitive processors may control other functions, such as monitoring sensors, input keypads, etc. In addition, multiple computer systems may be connected to a network, whereby they may communicate with each other. Each of these processors or systems must have some defined path for communications.

The design requirements for communications paths vary. For example, where a communications path must pass a large volume of data over a relatively short distance, such as the path from a disk storage controller to main memory, a wide parallel bus is usually employed. On the other hand, a low volume path to a more remote device calls for a less expensive method, usually a serial communications protocol.

In certain applications there is a need for a low volume communications network enabling a plurality of nodes to send occasional messages to each other. A typical such application is a network of monitoring nodes connected to a master control node, in which each monitoring node contains a microprocessor which monitors the status of, and makes occasional adjustments to, some set of physical parameters. In such a network, the central control node must be made aware of any status changes and must be able to issue adjustment commands to the monitoring nodes. While it is not necessary that such a network be able to support a high volume of network traffic, it must be able to communicate quickly and reliably when there is a status change.

In the type of network application described above, it is desirable to hold the cost of the network as low as possible while providing the required capabilities. A variety of serial communications protocols exist. However, these protocols either require more hardware than minimally necessary, or do not provide the desired degree of function or reliability.

It is therefore an object of the present invention to provide an enhanced method and apparatus for communicating among a plurality of nodes in a network.

Another object of this invention is to reduce the cost of communicating among a plurality of nodes in a network.

Another object of this invention is to increase the reliability of a low cost, low volume communications network.

Another object of this invention to provide an enhanced method and apparatus for communicating among a control node and a plurality of monitoring nodes in a monitoring network.

Another object of this invention is to reduce the cost of communicating among a control node and a plurality of monitoring nodes in a monitoring network.

Another object of this invention is to increase the reliability of a monitoring network comprising a control node and a plurality of monitoring nodes.

SUMMARY OF THE INVENTION

A plurality of nodes in a network are connected in a tree arrangement. A master control node is at the root of the tree. Each connection between a parent node and a child node in the tree consists of only one pair of wires, over which data bits are transmitted serially.

To avoid contention, communications are always initiated by the parent node. The child node detects the end of message when no more data is received for a set timeout period. The child node then has a specified time interval for response to the communication, during which interval it has control of the line. After the end of the interval, control reverts to the parent. If a message has been received from the child within that time, normal status is resumed; otherwise, the parent retries the message or takes other error recovery actions.

In the preferred embodiment, the network is used to monitor power conditions at a plurality of nodes in a computer system. The system is housed in one or more generic racks. Each rack contains an independent power inlet, and space for a plurality of separately powered device units, such as disk drives, tape drives, circuit card enclosures, etc. The device units receive their power from a power distribution box in the rack. Each rack power distribution box, and each separately powered device unit, contains a power monitoring node which is part of the network. During normal system operation, the master control node repetitively issues a status request message, and waits for a reply. The status request is propagated down the tree to each monitoring node, and the replies propagate back to the master control node. Any loss of power or other irregular status gets reported back to the master control node in a relatively short period of time. The master control node can also issue commands to turn power on/off or perform other functions, or download code.

DETAILED DESCRIPTION OF THE PREFERRED EMBODIMENT

Figure 1:
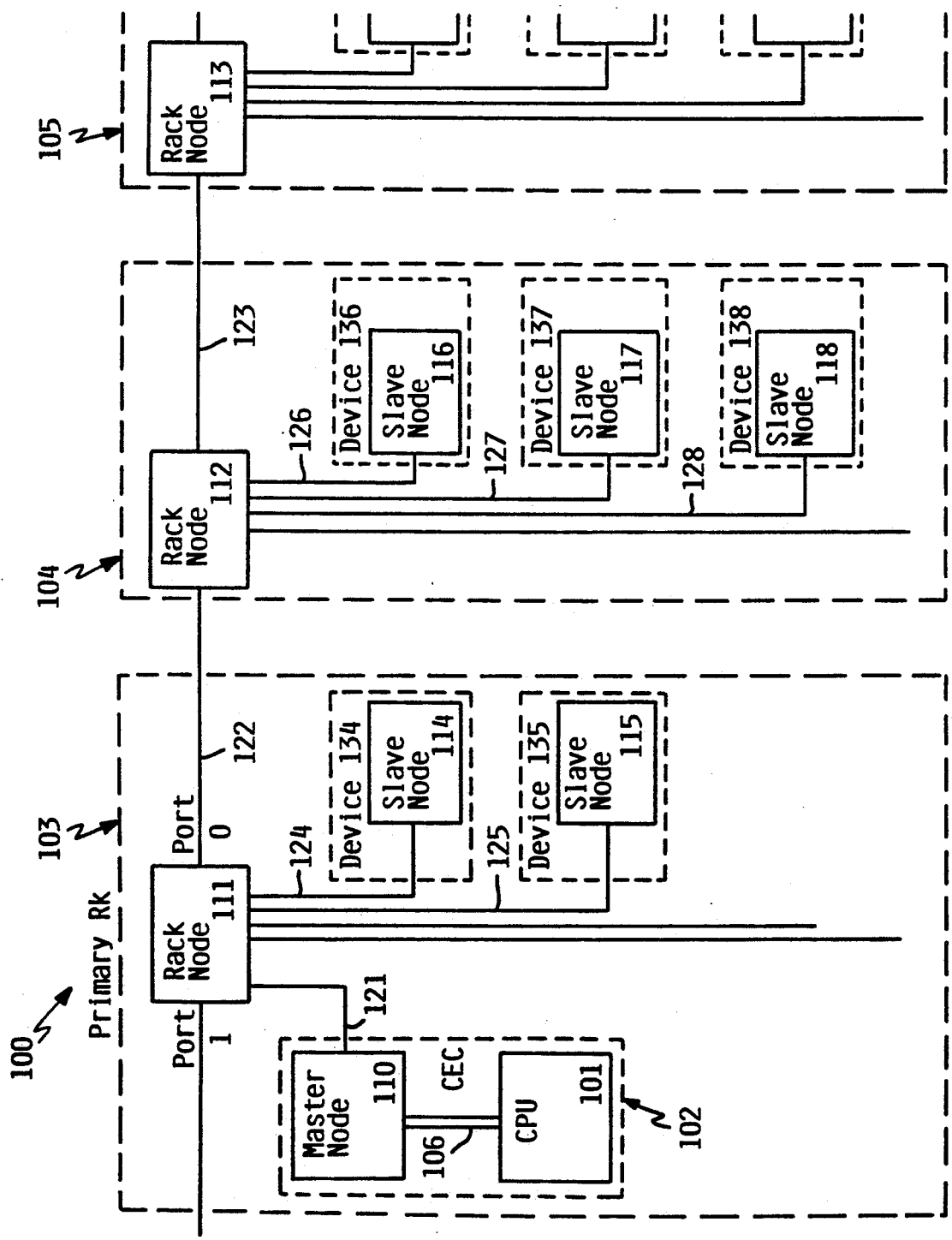
FIG. 1 shows the major components of a power monitoring network according to the preferred embodiment of this invention.

A diagram of the major components of a communications network according to the preferred embodiment of the present invention is shown in FIG. 1. In this preferred embodiment, the network is used to monitor power conditions at a plurality of devices in computer system 100, although such a network could be used for other purposes. Computer system 100 is housed in one or more generic racks 103-105, one of which is designated the primary rack 103, each rack containing an independent power inlet and space for a plurality of separately powered device units, such as disk drives, tape drives, circuit card enclosures, etc. The system central processing unit (CPU) 101 is contained in a central electronics complex (CEC) 102, mounted in primary rack 103. The device units 134-138 receive their power from a power distribution box in the rack. Each rack power distribution box contains a rack power monitoring node 111-113. Each device unit 134-138 in the rack contains a slave power monitoring node 114-118. Each slave node 114-118 is connected via a network connection 124-128 to the rack node of the rack in which the corresponding device unit is installed. Rack nodes 111-113 are connected via network connections 122-123 to other rack nodes. Master power monitoring node 110 monitors power conditions at CEC 102. Master node 110 is connected to primary rack node 111 via network connection 121. Master node 110 also communicates with system CPU 101 via system interface 106, which does not observe the same protocol as the power monitoring network. Each network connection 121-128 consists of a single pair of wires for transmitting a single differential serial data signal. A pair of wires is used to obtain noise immunity, it being understood that in an alternative embodiment a single wire could be used to transmit a signal where the transmitting and receiving nodes share a common ground. The connections do not contain clock lines, interrupt lines, or other signals. While three rack nodes 111-113 and five device nodes 114-118 are shown in FIG. 1, it should be understood that the actual number of rack nodes and device nodes in system 100 is variable. In the preferred embodiment, system 100 is an IBM AS/400 computer system, it being understood that other systems could be used.

The nodes of the network are connected in a hierarchical configuration known as a tree. The term "tree" is used wherein in its mathematical sense, being characterized by the following properties. There is one and only one root node of the tree, which in this case is master node 110. All nodes other than the master node are subject nodes. All connections between nodes are binary, i.e. each connection connects two nodes to each other. One of the nodes of each connection is the parent node, while the other is the child node, the parent node being the node closest to the root node. Each node in the tree is connected to one and only one parent node, except for the root node which has no parent. However, each node may be connected to zero, one, or more than one child nodes via separate connections. Finally, there exists one and only one path from any node in the network to the root node. These characteristics of a tree are essential to the proper operation of the network protocol described herein. In the preferred embodiment, all slave nodes (contained in device units) are child nodes of the rack node for the rack in which the device is mounted, and slave nodes themselves have no children. All rack nodes are parent nodes of the slave nodes contained in the rack. Primary rack node 111 is the only child node of master node 110, and may be the parent node of up to two other rack nodes. Each rack node other than primary rack node 111 is a child node of one other rack node, and may be the parent node of one other rack node. All slave nodes and all rack nodes are subject nodes.

Figure 2A:
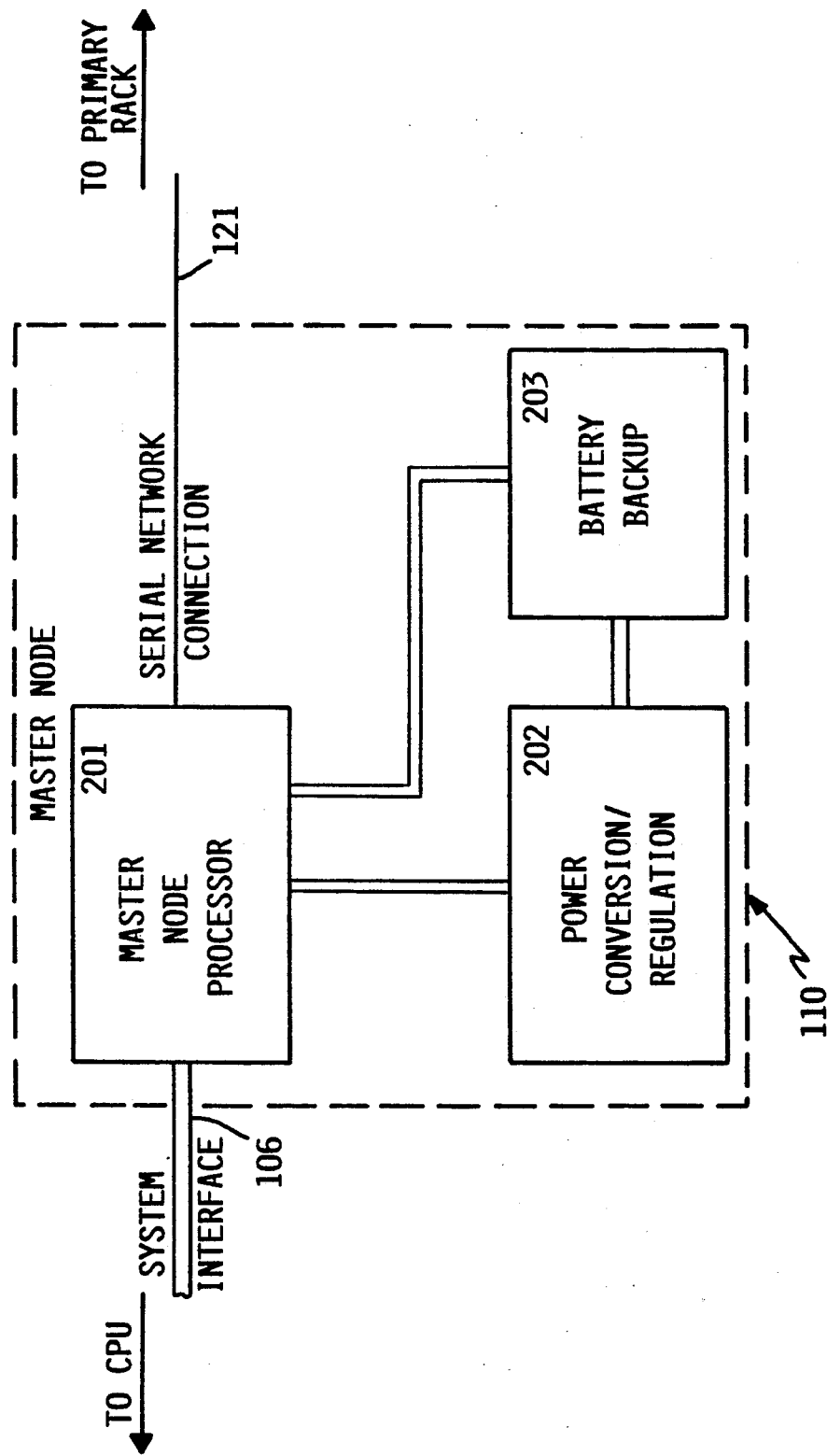
FIGS. 2A, 2B and 2C show the structure of typical nodes in a power monitoring network according to the preferred embodiment.
Figure 2B:
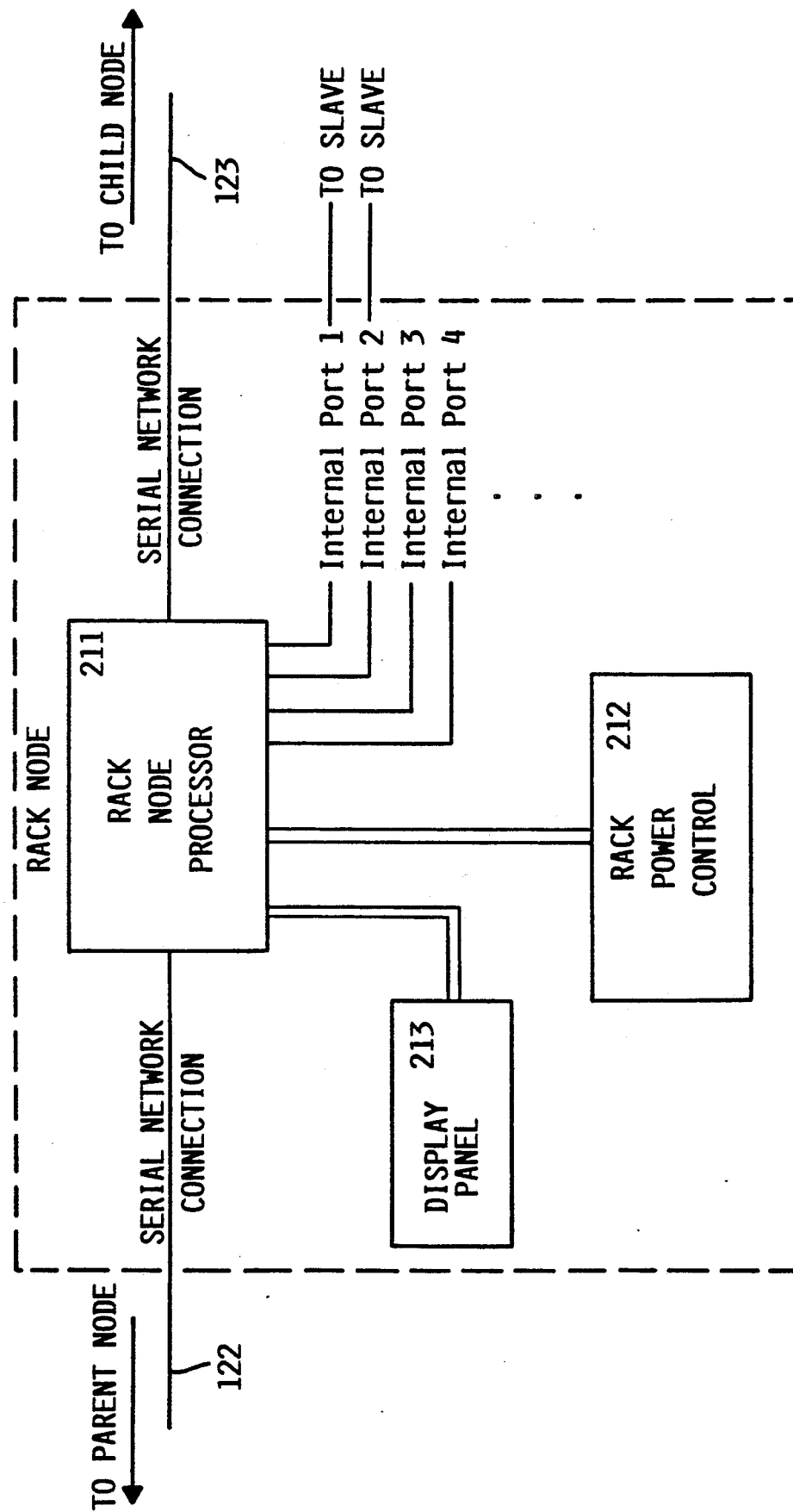
Figure 2C:
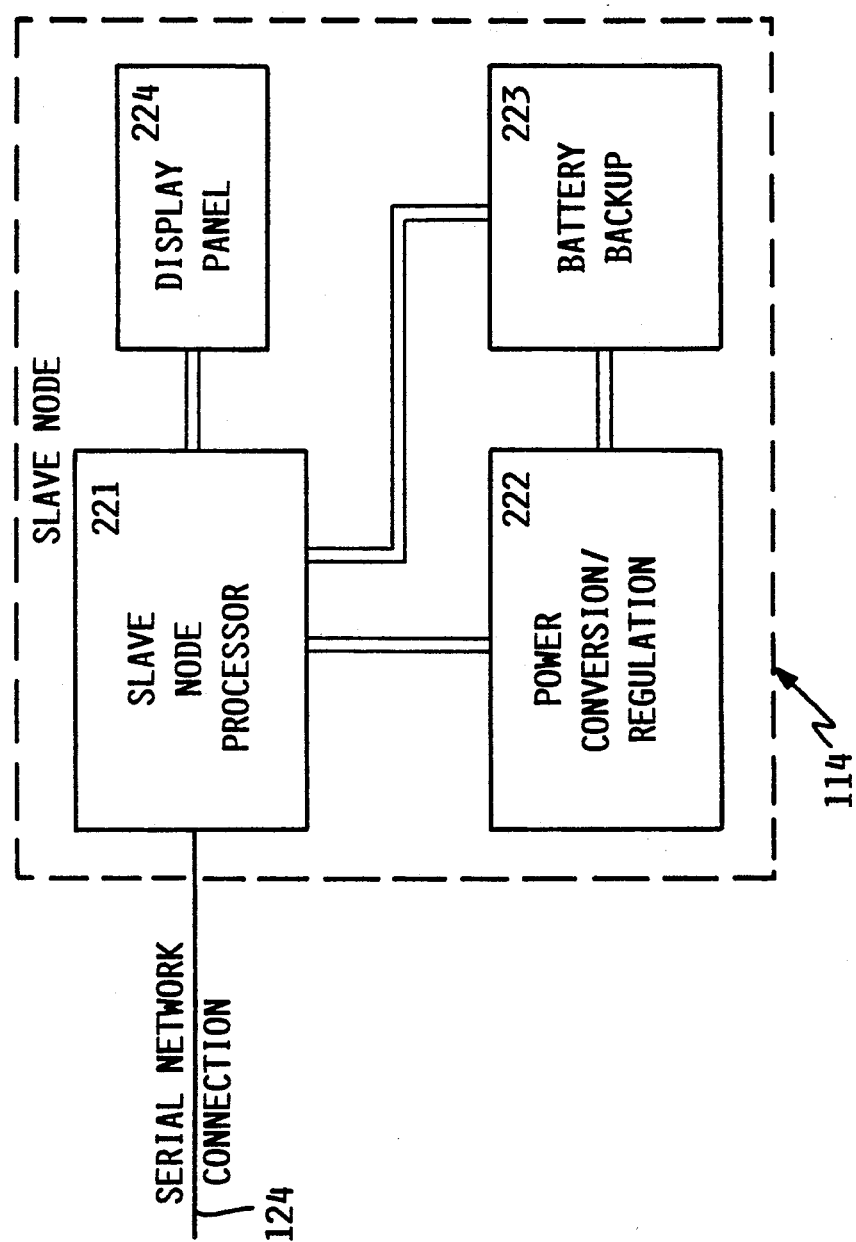

FIG. 2 shows the structure of the typical nodes according to the preferred embodiment. Master node 110 comprises a programmable master node processor 201, coupled to power conversion/regulation hardware 202 which supplies power to CEC 102, and battery backup 203 which provides emergency power to CEC 102 in the event of power loss. Master node processor 201 contains a serial port linking it to the network via connection 121, and an interface 106 to the CPU.

A typical rack node 112 comprises programmable rack node processor 211 coupled to rack power control hardware 212 and display panel 213. Rack power control hardware 212 controls the rack power distribution box, while display panel 213 comprises a small display for displaying status and fault conditions. Rack node processor 211 includes two network ports to other racks 122,123, one of which (122) connects to the parent node of rack node 112, and the other of which (123) connects to the child node of rack node 112, it being understood that in the rack node at the end of a string of racks so connected, the port to the child will be unused. Rack node processor 211 also includes a plurality of rack internal ports used to connect slave nodes. Primary rack node 111 is similar to rack node 112 shown in FIG. 2, except that one of the rack internal ports is used to connect to master node 110, and both network ports to other racks connect to child nodes of the primary rack node, enabling two strings of rack nodes to connect to primary rack node 111.

A typical slave node 114 comprises programmable slave node processor 221 coupled to conversion/regulation hardware 222 which supplies power to the device unit, and battery backup 223 which provides emergency power to the device unit in the event of power loss. Slave node processor 221 is also coupled to display panel 224 for displaying status and fault conditions. Slave node processor 221 also includes a serial port connecting it to the rack node via serial network connection 124.

In the preferred embodiment, processors 201, 211,221 comprise Intel 8051 family microprocessors. These microprocessors each contain a simple built-in serial port containing a driver and receiver, supporting a 10-bit asynchronous start-stop protocol. Rack node processor 211 includes a multiplexor chip coupled to the microprocessor, enabling the microprocessor to support multiple serial ports. Each of these multiple ports can be independently enabled or disabled. Because all ports are coupled to the single serial port in the microprocessor, it is not possible to transmit different data to different ports simultaneously, nor is it possible to receive data from different ports simultaneously (although it is possible to listen for the start of a message on more than one port simultaneously).

Figure 3A:
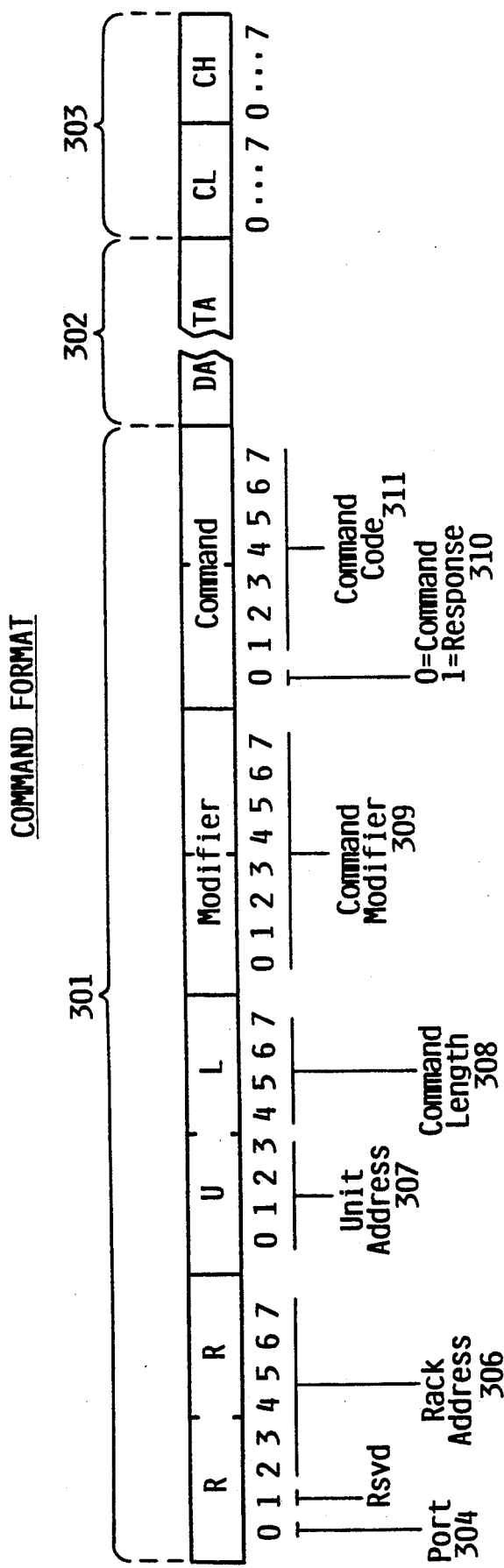
FIGS. 3A and 3B show the format of commands and responses used for communications on the network according to the preferred embodiment.
Figure 3B:
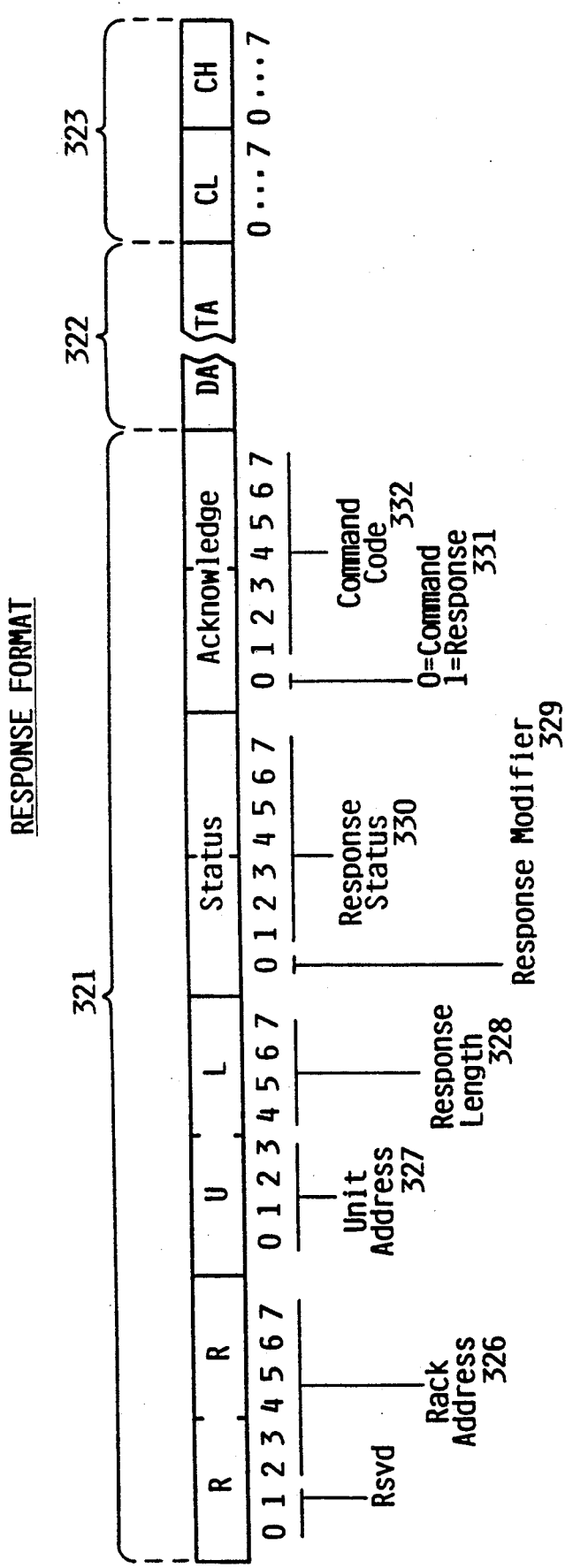

Communications on the network consist of commands and responses. By definition, a command is an outbound communication (i.e., from parent to child), while a response is an inbound communication (i e., from child to parent). FIG. 3 shows the format for commands and responses. Commands and responses comprise 4-byte header 301,321, optional variable length data field 302,322, and 2-byte block check 303,323. Rack address fields 306,326 specify the address of the rack to which a command is directed, or from which a response comes. A rack address of 0 is used to designate "all racks", in a command to be broadcast. Port field 304 specifies the port of the primary rack to which the addressed rack connects (i.e., the side of the primary rack on which the addressed rack is located); port field 304 is used only by the primary rack to determine the routing of a message. Unit address fields 307,327 specify the address of a slave node associated with a device unit in a rack. A unit address of 0 specifies the rack node itself, while a unit address of F (hex) specifies all nodes within the rack. With this addressing arrangement, the master node is capable of directing a command to any individual node, to all nodes within any individual rack, or to all nodes in the network. Length fields 308,328 specify the length of the respective data fields 302,322. A length field of 0 specifies no data field, while a non-zero length value L specifies a field of length $2^{**}(L-1)$ bytes. Command/response bits 310,331 specify whether a message is a command or a response. Command code fields 311,332 specify the command. Command modifier field 309 is an extension to command code field 311, specifying further information for certain commands. Response status field 330 specifies the status of the responding node, while response modifier 329 is an extension to status field 330. Variable data fields 302,322 contain data accompanying the command or response. Block check fields 303,323 contain a polynomial checksum of the transmitted message, enabling the receiving node to verify that all data was correctly received.

The power control network of the preferred embodiment is used to control power at locations remote from the CPU and to report power irregularities. During normal system operation, master node 111 repeatedly executes a network interrogation cycle, wherein it issues a broadcast command to the nodes in the network, requesting status. This broadcast command propagates down to each rack node, where the rack nodes interrogate their slave nodes for status. Rack nodes assimilate the responses, and build a response to the master node. These responses propagate back to the master node. After the master has received responses from all racks, it starts the cycle over again.

Figure 4A:
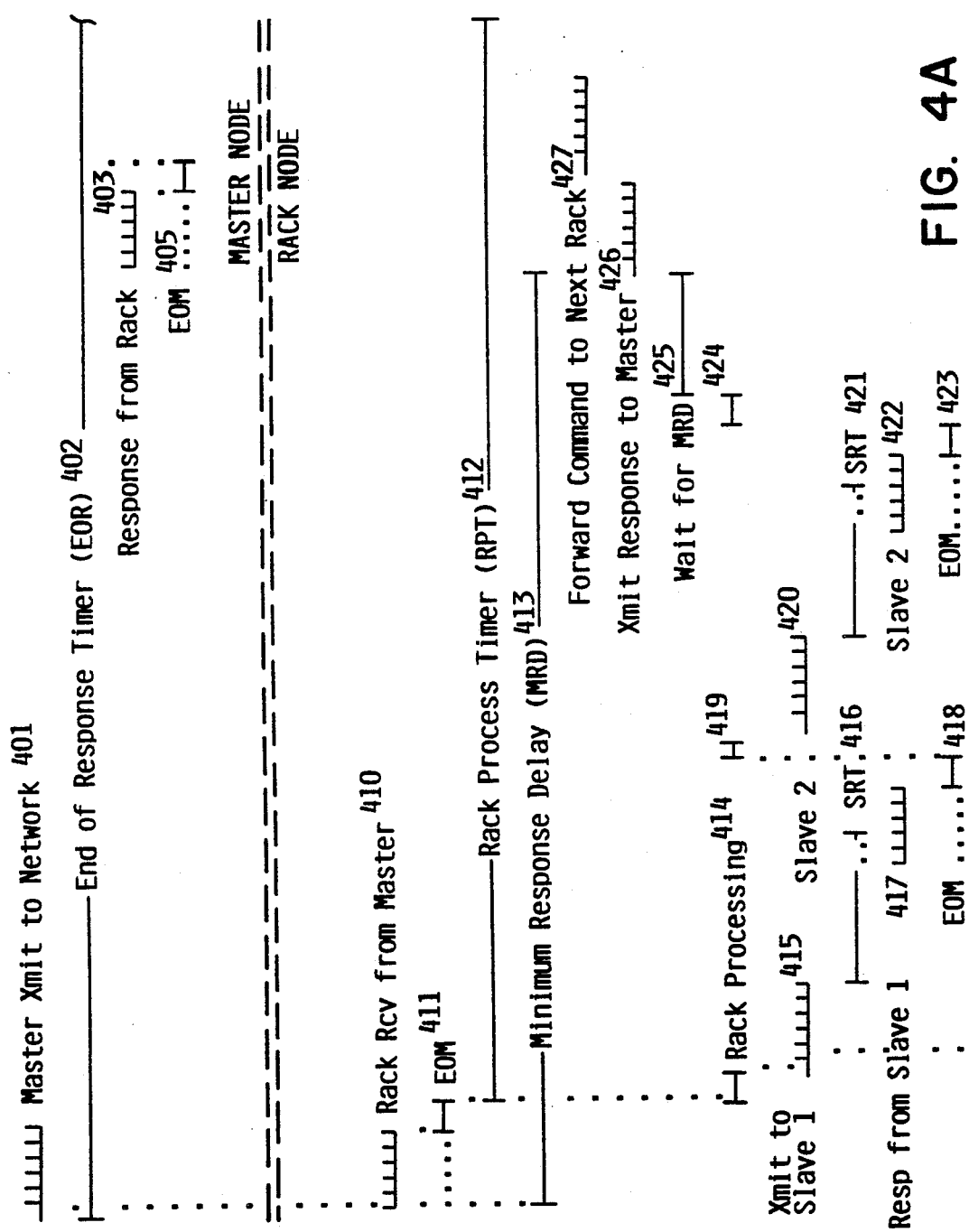
FIGS. 4A, 4A$_2$ 4B are a timing diagram of the network communications protocol for a typical broadcast transmission according to the preferred embodiment.
Figure 4B:
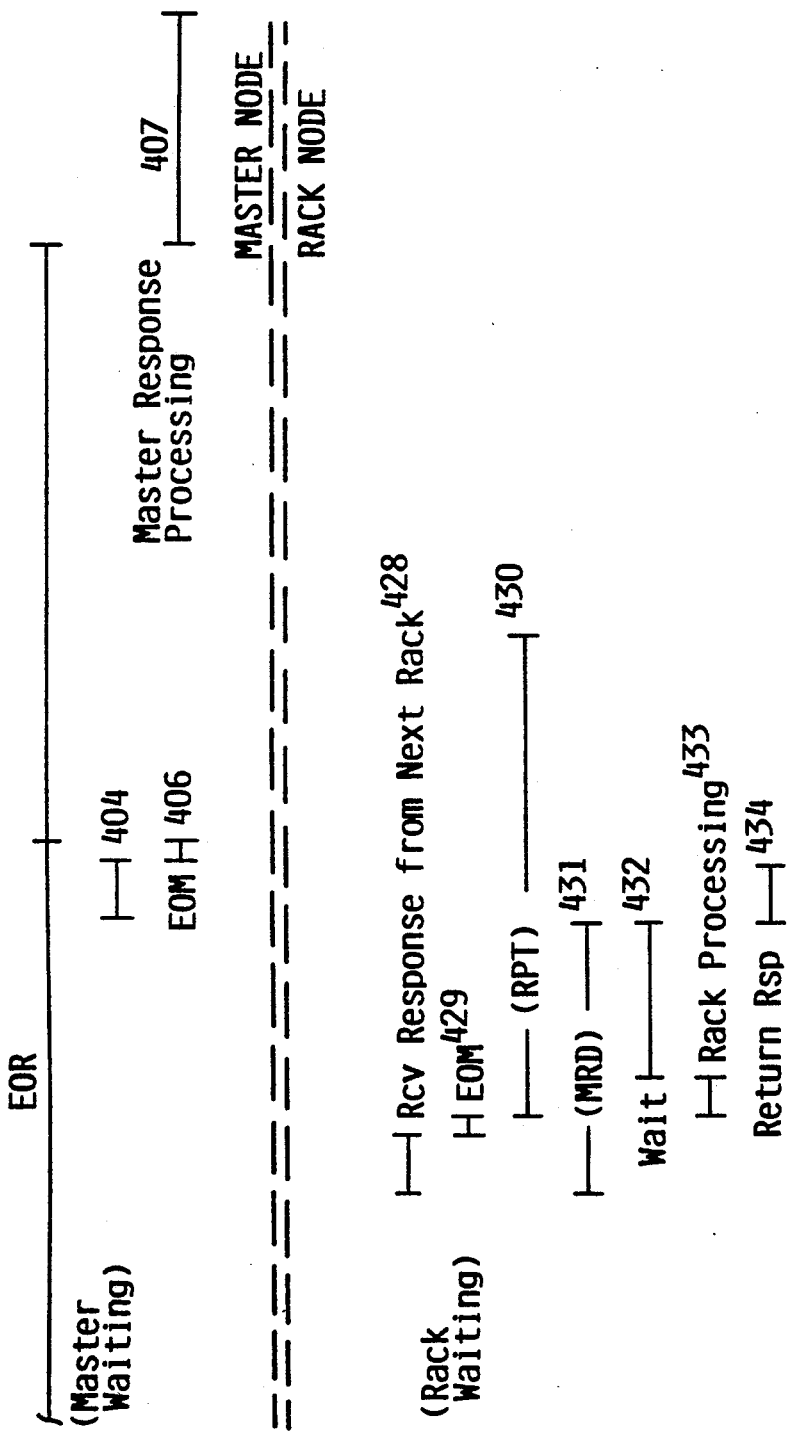

The hardware includes no special collision detection circuitry and no interrupt lines, helping to achieve a reduction in cost. Therefore a defined protocol must exist that will ensure that two nodes do not attempt to use a connection simultaneously. FIGS. 4A and 4B show a timing diagram of the network protocol for a typical status interrogation cycle. Master node 110 initiates the cycle by sending a broadcast message to the other nodes requesting status 401. At the same time, master node 110 sets an End of Response timer (EOR) 402. Master node 110 releases control of its network connection 121 for the duration of the EOR 402, and will not transmit anything further during this period. Control of line 121 reverts to master node 110 when the EOR times out.

A rack node receives the broadcast command one byte at a time 410. At the start of the message, the rack node resets a minimum response delay (MRD) timer 413. As each byte is received, an end of message timer (EOM) 411 is reset. EOM times out 411 when no bytes have been received for the timeout period, telling the rack node that the message has completed. At this point a rack process timer (RPT) 412 is started. The rack node then processes the message 414, and in the case of a broadcast message determines that it should be sent to all slaves in the rack. It transmits the message to the first slave in the rack 415, and at the completion of transmission sets a slave response timer (SRT) 416. The rack node releases control of the network connection to the slave node for the duration of the SRT, and will not attempt to transmit anything on the line during this period.

The first slave node receives the message transmitted by the rack node one byte at a time 450, and reset an EOM timer as each byte is received. When the EOM timer times out 451, the slave determines that the message has completed. It then sets a slave process timer 452 and processes the command 453. When the command has been processed, the slave transmits its response back to the rack node 454. The rack node receives the response one byte at a time 417 and resets an EOM timer as each byte is received. When the EOM time times out 418, the rack node determines that the slave has finished transmitting, and processes the slave's response 419. The slave has control of the line (is entitled to transmit) only for the duration of the slave process timer 452, which is shorter than and included within the SRT 416 in the rack node. Thus, only one of the slave or rack nodes can transmit on the line at any one time, avoiding collisions.

The rack node repeats the above sequence for each slave node in the rack, sending the message 420, setting the SRT 421, receiving the response 422, waiting for EOM to time out 423, and processing the response 424. Each additional slave similarly receives the message 460, waits for EOM to time out 461, sets its slave process timer 462, processes the command 463, and transmits its response 464. While two slaves are shown in FIG. 4A, it should be understood that the actual number of slaves is variable.

When the rack node has completed processing the response from the last slave 424, it waits for the MRD timer to time out 425. It then transmits its response up the network 426 toward the master. This response contains the aggregate status of the slave nodes in the rack, and the rack node. After transmitting the response 426, the rack node retransmits the original command down the network to the next rack 427. The rack node is entitled to transmit up the network only after the MRD timer expires and before the RPT time expires. After forwarding the command down the network, the rack node relinquishes control of the lines and listens for the next message, which should be a response from the next rack. The rack receives this response 428, setting an EOM timer to determine when the message has completed 429. It again sets its MRD timer when it receives the first byte 431, and the RPT timer when the message has finished 430. It processes the message and determines that the message is a response going up the network (rather than a command going down the network) 433. It then waits for the MRD to time out 432, and retransmits the message up the network toward the master 434. As before, it is entitled to transmit only in the interval between the expiration of the MRD timer and before the expiration of the RPT timer. The rack node does not keep track of which rack nodes have responded. It simply listens for messages coming from either direction on the network after it has finished transmitting. The next communication could be either a response from another rack or a command from the master; it determines the character of the message from the command/acknowledge bit 310,331, and responds accordingly. While FIGS. 4A and 4B show the rack node in direct communication with the master node which is strictly true only in the case of the primary rack, it should be understood that all rack nodes use the same timing protocol. There would be a delay in the actual propagation of a message to and from the master to a remote rack node, but from the point of view of the rack, the next rack up the network (in the direction of the master) acts as if it were a master.

While the master node's EOR timer has not expired, it listens for responses from the racks. As each response is received 403,404, it resets an EOM timer to detect the end of the transmission 405,406. When a transmission ends, it resets the EOR timer. Thus, master node 110 continues listening as long as responses continue to come in from the racks at regular intervals. Since racks must transmit during specified time intervals, it is possible to choose a suitable value for EOR that will avoid collisions, and return control of the line to the master within a reasonable time after all nodes in the network have responded. When the EOR finally times out, the master node processes the responses 407. If all responses are normal, it will restart the cycle; otherwise, it may take error recovery action as warranted.

Each node activates a transmit timer when transmitting a message. The transmit timer is the transmitters complement to the EOM timer in the receiving node. The transmit timer assures that the separation between bytes does not exceed some predefined amount, which might otherwise cause the receiving node to think the message has ended. If for any reason the transmitting node is unable to transmit the next byte of a message before the transmit timer times out, the transmission is aborted.

The master node can download updated versions of the control programs running in rack and slave node processors. Prior to such a download operation, the master node sends a preparatory message to all nodes for which the updated program is intended. The download of a control program for racks is accomplished in the same manner as any broadcast message to multiple racks. A special variety of broadcast command enables the master to download a control program to multiple slaves. When the rack node receives a download command with the slave broadcast format, the command is transmitted to all slave nodes in the rack simultaneously. This is accomplished by enabling the serial drivers to all slave ports and transmitting the data as if only one slave were addressed. Since all slaves receive the data simultaneously, they will all attempt to execute and transmit a response at approximately the same time. This would certainly result in a garbled message at the rack since all slave receivers are logically ORed into a single receive input port in the microprocessor. The rack therefore ignores slave node responses to the download command. The rack node assumes the operation was successful, builds a response on behalf of the slave nodes and returns the collective successful response to the master node. The download operation consists of several successive download commands to transfer a complete code load to the slave nodes. The slave nodes are polled after completion of the download operation (or some significant part thereof) to determine whether it was successful. This download mechanism results in considerable time savings.

When the command is not a broadcast command, but is directed to a single node, the sequence is similar but certain steps are omitted. A rack in the chain of transmission between the master and the addressed node will not poll its slaves or generate a responsive message to the master, but simply forward the command down the network and wait for the response. Of additional significance, when the command is not a broadcast command the MRD timer is not used. The purpose of the MRD timer is to enforce a minimum separation between messages going up the network toward the master. If this separation were not enforced, it would be possible for a short response (from a rack having few nodes) to catch up with a longer response and collide with it. The MRD timer is not necessary when there will only be one response going back to the master.

Since the network depends heavily on timers to avoid collisions, in the preferred embodiment all timer values are fixed, predefined values, which are the same for all nodes of a particular class. For example, in the preferred embodiment all transmit timers are 0.9 msec, all EOM timers are 1.0 msec, all slave process timers are 3.0 msec, all slave response timers are 5.0 msec, all MRD timers are 40 msec, and all rack process timers are 210 msec. The EOR timer, however, has two possible predefined values, depending on the type of pending command. Where the master node has transmitted a broadcast command, the EOR timer value is 250 msec; where the command is directed to a single node, the value is approximately 2 sec. The reason for the longer EOR value in the case of a command to a single node is that a broadcast command will elicit responses from all the rack nodes, coming at regular intervals. A command to a single node may will not elicit such responses, and the EOR timer therefore could time out before getting a response from a node at a remote location in the network.

Each node checks a received message for transmission errors. The length of the message is verified against the length field of the message header, and a polynomial check sum is computed and compared with the check sum in the last two bytes of the message.

The hierarchical network structure assures recovery from transmission errors. Any error message for a network error condition is sent up the network to the master node, regardless of where the error originated. For example, if a rack node receives a garbled message coming up the network from another rack, it does not request that the originating node retransmit the message, but sends a message to the master. The master node decodes all error messages and determines appropriate action. Every node in the network (other than the master) will eventually set itself in idle mode and activate its receiver, waiting for a message. Thus, the network quiesces itself after certain timers have expired, allowing the master to resume control after any unpredictable occurrence.

Figure 5A:
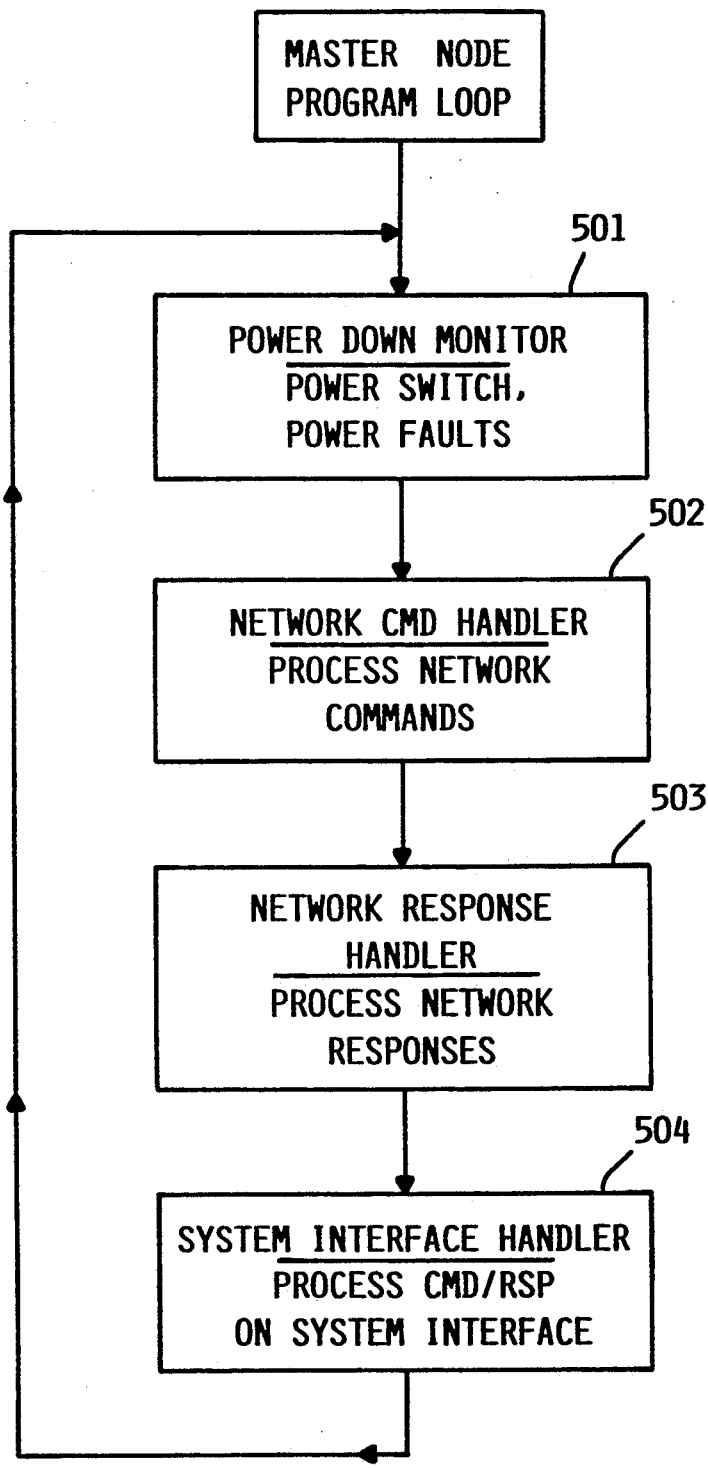
FIGS. 5A, 5B and 5B$_2$ show the operation of the master node control program according to the preferred embodiment.
Figure 5B:
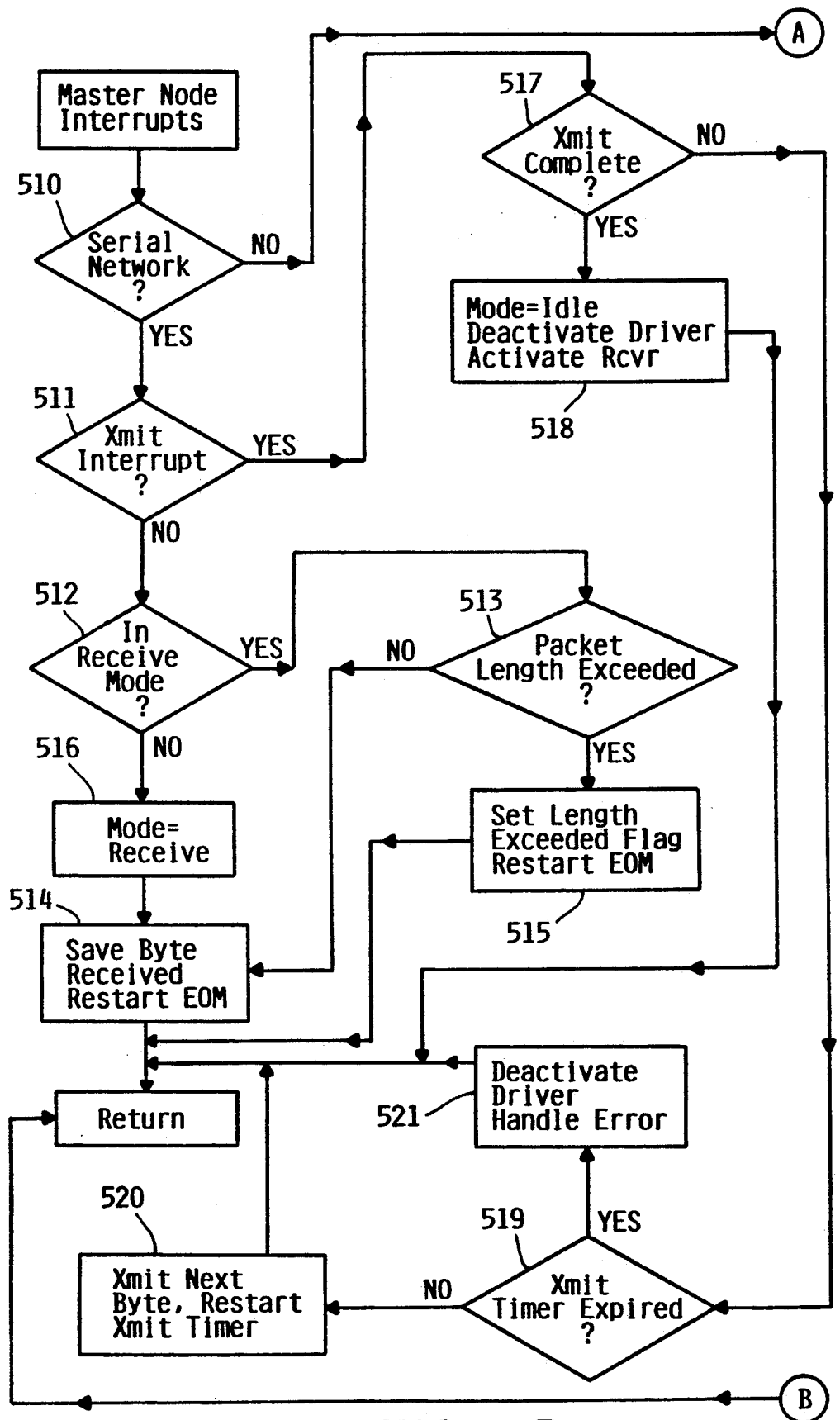

The operation of the master node control program running in master node processor 201 will now be described. This operation is shown in FIGS. 5A and 5B. The control program comprises power down monitor routine 501, network command handler routine 502, network response handler routine 503, and system interface handler routine 504. Power down monitor routine handles powering down of the system as a result of power switch settings, power faults, etc. Network command routine 502 handles the processing of commands going out to the network. Network response routine 503 processes responses received from the network. System interface routine 504 handles communications with the system CPU. In operation, the control program repetitively loops through the various routines, each of which determines whether any immediate service is required. This loop can be interrupted by any of various interrupts, and in particular, by interrupts which handle network communications.

The master node interrupt handler is shown in FIG. 5B. If the interrupt is a serial network interrupt (i.e., a hardware interrupt generated by the processor's serial network circuitry when a byte has been received or transmitted) (step 510), the program determines whether it is a transmit or receive interrupt (step 511). If it is a receive interrupt, and the program is in receive mode (step 512), it checks for a packet length error (step 513). If packet length has not been exceeded, the byte is saved and the EOM timer restarted (step 514), otherwise an error flag is set and the EOM timer restarted (step 515). If the program is not in receive mode (step 512), the interrupt was caused by the first byte of a transmission; the program sets itself in receive mode (step 516), saves the byte, and restarts the EOM (step 514). If the interrupt was a transmit interrupt (step 511), the program checks whether the transmission is now complete (step 517), and if so sets the program mode to idle, deactivates the serial driver and activates the receiver (step 518). If transmission is not complete (step 517), the program checks the transmit timer (step 519). If the transmit timer is not expired, it transmits the next byte and restarts the transmit timer (step 520); otherwise it deactivates the serial driver and sets an error indicator (step 521). If the interrupt was not a serial network interrupt (step 510), the program checks for other types of interrupts. If the end of message timer timed out, indicating that a received message has completed (step 522), the EOM timer is stopped, program mode is set to idle, the received message is checked for errors, and the EOR timer is restarted (step 523). If the End of Response timer timed out (step 524), the program deactivated the serial receiver and sets an EOR flag (step 525). Other interrupts not relating to network communications are handled as appropriate (step 526). All master node interrupts return control to the control program loop 501-504 after interrupt processing is complete.

Figure 6A:
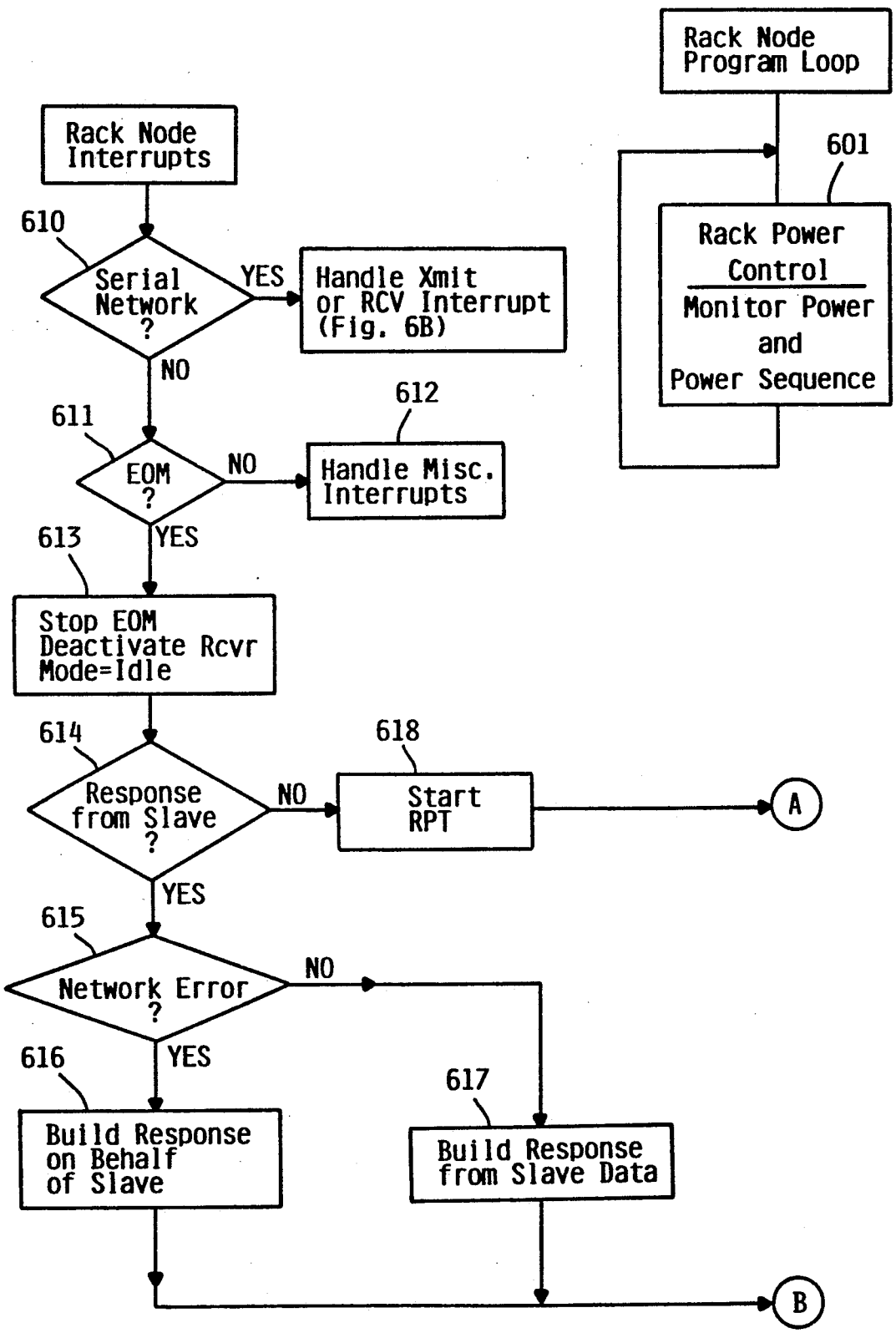
FIGS. 6A, 6A$_2$, 6B and 6B$_2$ show the operation of the rack node control program according to the preferred embodiment.
Figure 6B:
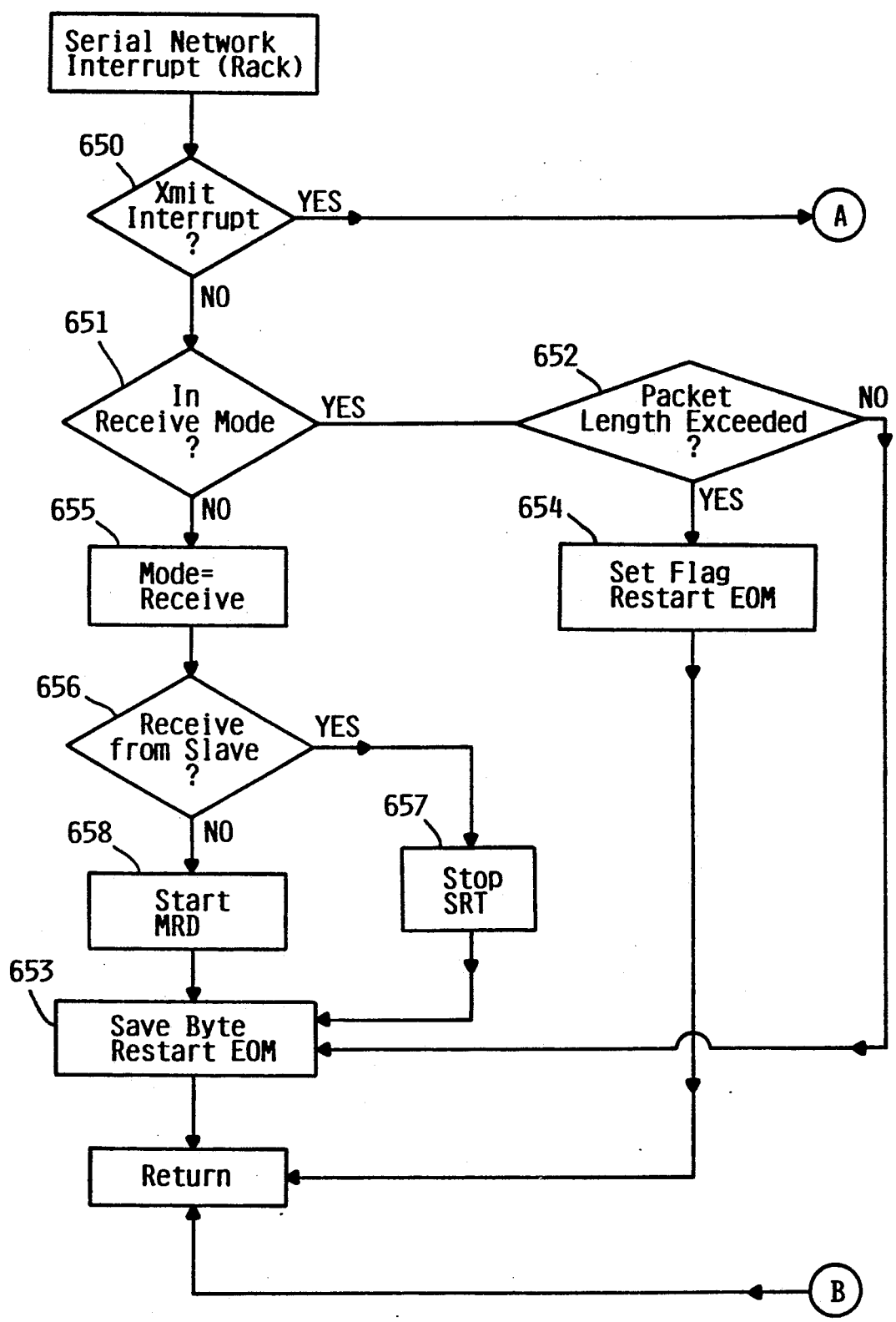

The operation of the rack node control program running in rack node processor 211 is shown in FIGS. 6A and 6B. The control program comprises power control routine 601 for monitoring power at the local rack node, which runs continuously until interrupted. The interrupt handler determines the type of interrupt. The interrupt handling of serial network interrupts is shown in FIG. 6B. The handling of EOM interrupts is shown in FIG. 6A; the handling of other miscellaneous interrupts is not shown in detail. If the interrupt was a serial network interrupt (step 610), it was either a transmit or receive interrupt. If the interrupt is not a transmit interrupt (i.e., it is a receive interrupt) (step 650), and the program is in receive mode (step 651), it checks for a packet length error (step 652). If packet length has not been exceeded, the byte is saved and the EOM timer restarted (step 653); otherwise an error flag is set and the EOM timer restarted (step 654). If the program is not in receive mode (step 651), the program sets itself in receive mode (step 655). If the message is from a slave (step 656), it stops the slave response timer (SRT) (step 657); otherwise it starts the minimum response delay timer (step 658). In either case, it saves the byte and starts the EOM timer (step 653). If the interrupt was a transmit interrupt (step 650), the program checks whether the transmission is now complete (step 660), and if so sets the program mode to idle and deactivates the serial driver (step 661). If the transmission was to a slave node (step 662), status is examined to determine if the transmitted message was a code download command (step 666). If so, the transmission is complete since the data was transmitted to all slaves simultaneously. The rack builds a successful response on behalf of the slaves (step 668) and proceeds to step 630 (FIG. 6A) to transmit the response up the network. If the slave transmit was not a download command (step 666), the program then enables the selected slave port receiver and starts the SRT (step 667). If the transmission was to another rack or the master (step 662), it determines whether the transmission was a response to a broadcast command (step 663). A broadcast command must be forwarded on down the network after the rack sends its response. If the transmission was a response to a broadcast command, the program begins transmission of the command to the next rack down the network (step 664). If not, the program stops the rack process timer (RPT) and enables the receiver ports from the racks (and master, if it is the primary rack) (step 665). If transmission is not complete (step 660), the program checks the transmit timer and RPT (step 669). If neither timer has expired, it transmits the next byte and restarts the transmit timer (step 670); otherwise it deactivates the serial driver, sets the mode to idle, and sets an appropriate error indicator (step 671).

If the rack interrupt was not a serial network interrupt (step 610), the program checks for EOM and other types of interrupts (step 611). Miscellaneous interrupts are handled as appropriate (step 612). If the EOM timer has timed out, indicating that a received message has completed (step 611), the EOM timer is stopped, program mode is set to idle and the receiver deactivated (step 613). If the message was a response from a slave node (step 614), it is checked for transmission errors (step 615). The rack uses the slave response to build a response to the master if no errors were detected (step 617), otherwise it builds a response on behalf of the slave (step 616). In either case, it then continues to process any additional slaves as described below (steps 627-632). If the message was not a slave response, the RPT is started (step 618) and the message checked for errors (step 619). If an error was detected, an error message is built for transmission up the network (step 620); the error message is sent up the network (toward the master node) regardless of where the transmission originated (steps 630-632). If no error was detected, the type of message is examined. If the received message is a response from another rack going up the network (step 621), it is forwarded up the network (steps 622,630-632). If the received message is a command addressed to another rack (step 623), the program initiates forwarding of the message down the network to the next rack (step 624). If the received message is a command addressed to the rack which received it (step 625), it is executed and a responsive message is constructed (step 626); the response is then sent up the network as described below (steps 630-632). If the command is a broadcast command to the slaves or addressed to a single slave, program control merges at step 627 with processing following a EOM timeout from a slave response (steps 616,617). At step 627, the program determines whether all slave nodes addressed by the command have been processed; if not, the program initiates transmission of the command to the next selected slave node (step 628). If all slaves have been processed, the response to the master is built from slave and rack node status (step 629), and the rack transmits the responsive message up the network (steps 630-632). If the command is a broadcast download command to the slaves in the rack, all slave port drivers are enabled before the command is transmitted to the slaves. Processing continues in FIG. 6B at step 660 when the transmission is complete. When a message is ready to be transmitted up the network, the program checks whether it is responsive to a broadcast command (step 630). If so, it waits for the MRD timer to expire (step 631). It then initiates transmission of the response up the network toward the master node (step 632). All rack interrupts return control to the power control routine loop 601 after interrupt processing is complete.

Figure 7A:
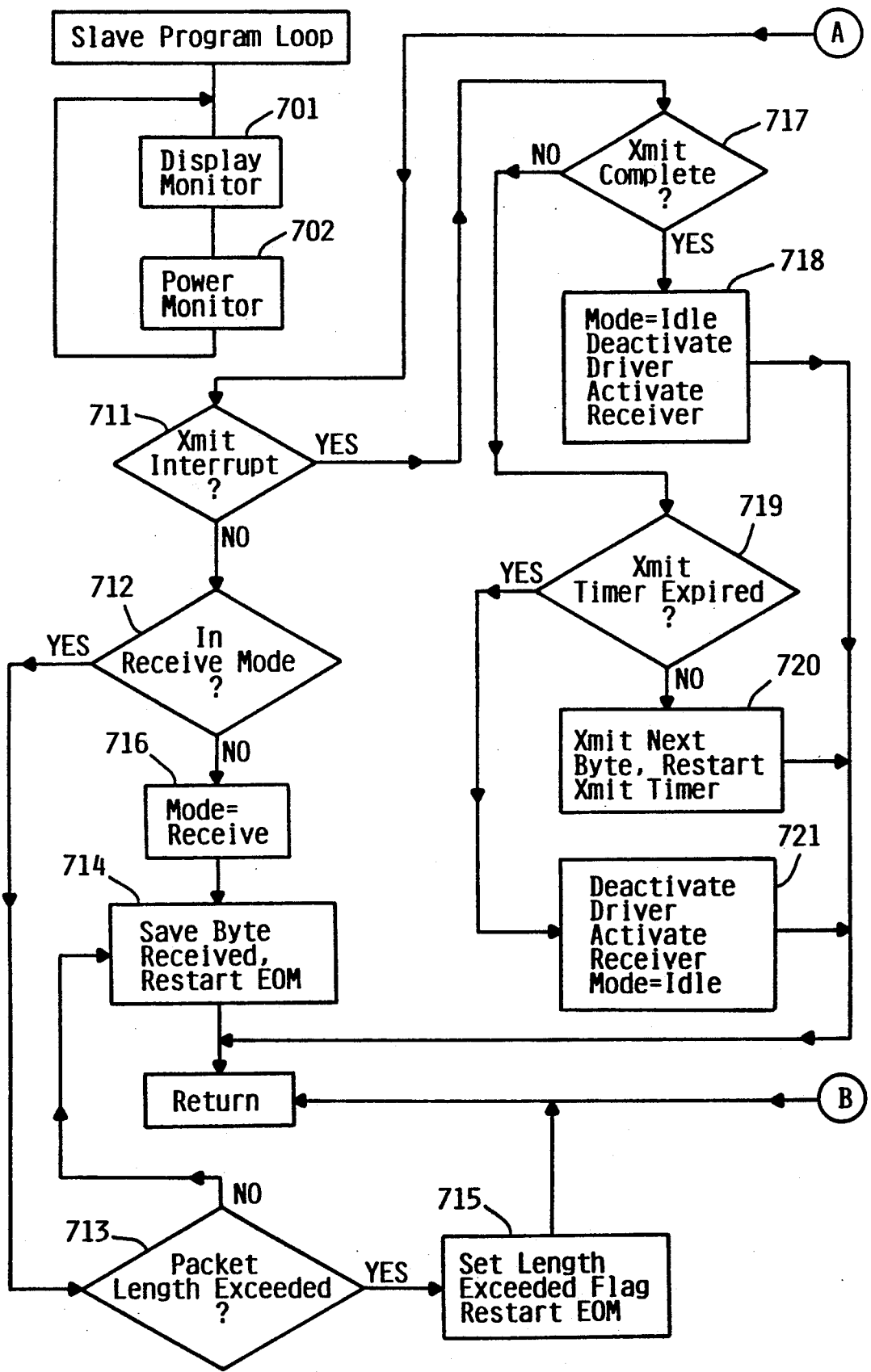
FIGS. 7A and 7B show the operation of the slave node control program according to the preferred embodiment.
Figure 7B:
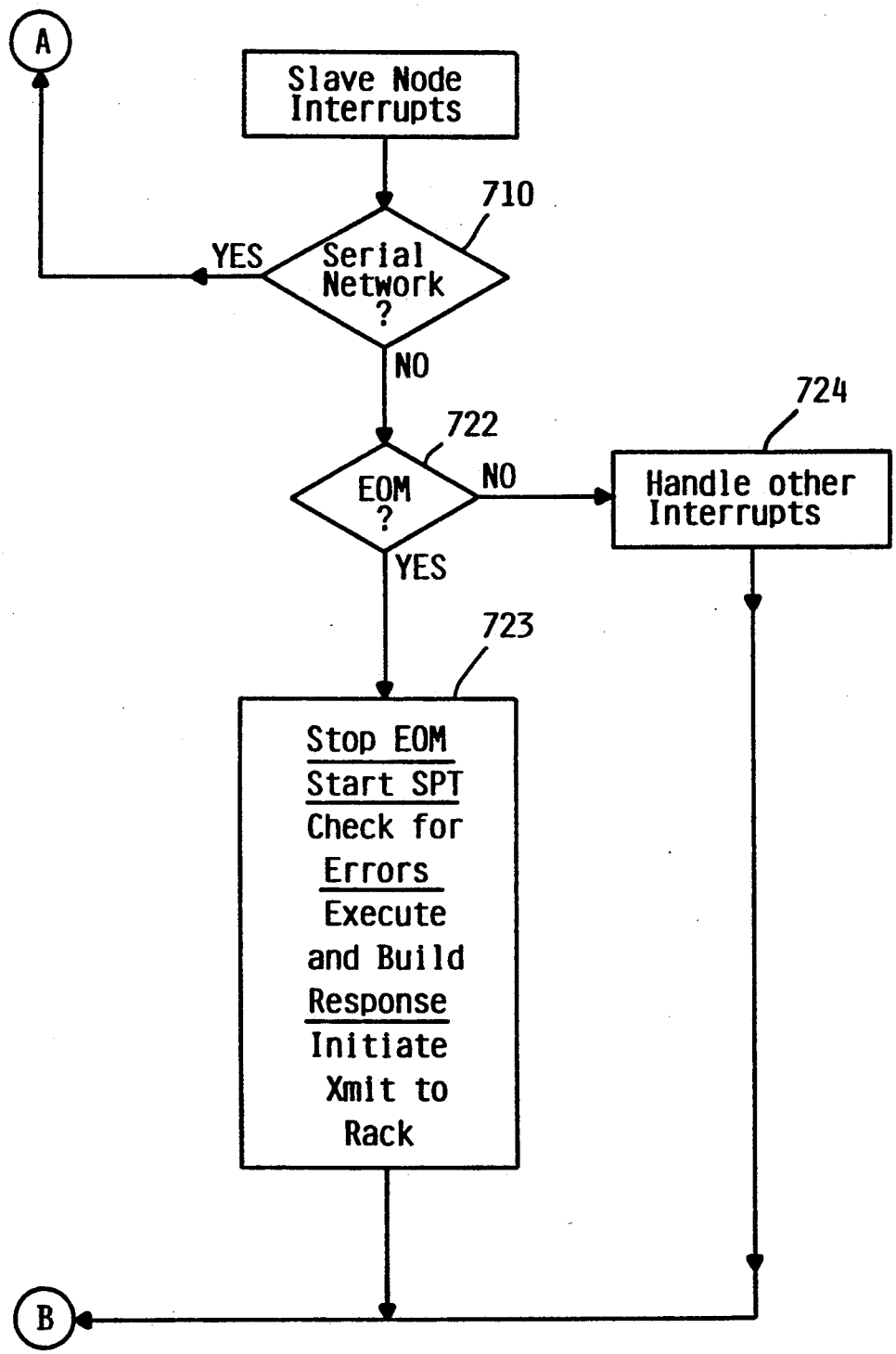

The operation of the slave node control program running in slave node processor 221 is shown in FIG. 7. The control program comprises display monitor routine 701 for controlling display panel 224 and power monitor routine 702 for monitoring power at the device unit in which the slave node is located. These control programs run continuously until interrupted. The interrupt handler then determines the type of interrupt. If the interrupt is a serial network interrupt (step 710), program determines whether it is a transmit or receive interrupt (step 711). If it is a receive interrupt, and the program is in not in receive mode (step 712), it sets itself in receive mode before proceeding (step 716). If it is already in receive mode (step 712), it checks for a packet length error (step 713). If packet length has not been exceeded, the byte is saved and the EOM timer restarted (step 714), otherwise an error flag is set and the EOM timer restarted (step 715). If the interrupt was a transmit interrupt (step 711), the program checks whether the transmission is now complete (step 717); if so the program mode is set to idle, the serial driver deactivated, and the receiver activated. (step 718). If transmission is not complete (step 717), the program checks the transmit timer (step 719). If the transmit timer has not expired, the program transmits the next byte and restarts the timer (step 720); otherwise it deactivates the serial driver, activates the receiver, and sets mode to idle (step 721). If the interrupt was not a serial network interrupt (step 710), the program checks for EOM and other interrupts. If the EOM timer has timed out, indicating that a received message has completed (step 722), the EOM timer is stopped, slave response timer (SRT) is started, program mode is set to idle, the received message is checked for errors, the command is executed and a response built (step 723). If the SRT has not expired by the time the response is built, the program initiates transmission of the response to the rack. Other interrupts not relating to network communications are handled as appropriate (step 724). All slave interrupts return control to the slave control program loop 701-702 after interrupt processing is complete.

In the preferred embodiment, the network is used to monitor power conditions at nodes in a computer system. Alternative embodiments of this invention could be used in a variety of communications network applications. In particular, this protocol is suited to monitoring type applications, where a plurality of monitoring nodes must reliably report any irregularities to a master node, and where the volume of data being transmitted in the network is not large. For example, in an alternative embodiment this protocol could be used to connect environmental sensor/controllers in various rooms of a building. In another alternative embodiment, it could be used to connect a variety of process monitors in an industrial process control facility.

In the preferred embodiment, there are three distinct types of nodes master, rack and slave. However, it should be understood that that actual number of such types is variable depending on the application, so long as a tree structure is maintained. For example, an embodiment could be constructed with one master node and a plurality of identically programmed subject nodes, each of which has one parent and may have a variable number of children. In addition, while the branching factor of the preferred embodiment is more than one, in an alternative embodiment the network nodes could be connected in a string, in which all network nodes have exactly one child (except for the node at the end of the string, which has none).

Although a specific embodiment of the invention has been disclosed along with certain alternatives, it will be recognized by those skilled in the art that additional variations in form and detail may be made within the scope of the following claims.

What is claimed is:

1. A communications network apparatus, comprising:
   a master node and a plurality of subject nodes;
   a plurality of connections running between nodes, each said connection comprising a single serial data signal carrier connected a pair of nodes, wherein one of said pair of nodes is a parent node with respect to the other of said pair of nodes, and the other of said pair of nodes is a child node with respect to said parent node, wherein said plurality of connections connect said master node and said plurality of subject nodes in a tree configuration, said tree having said master node at its root, wherein each of said plurality of subject nodes is connected to one or more nodes, one and only one of which is its parent;
   means in said master node and in each of said plurality of subject nodes for transmitting and receiving messages comprising serial data on said connections;
   end of message detection means in said master node and in each of said plurality of subject nodes for determining that a message being received has ended, wherein said end of message detection means determines that a message has ended when no more serial data is received on said connection for a predefined timeout period; and
   collision avoidance means in said master node and in each of said plurality of subject nodes for determining when said node is entitled to initiate transmission of a message on said connections, wherein said means permits a child node to initiate transmission of a message to its parent only during a predefined interval following the occurrence of a predefined event, and said means prevents a parent node from transmitting a message to said child during said predefined interval.

2. The communications network apparatus of claim 1, wherein said collision avoidance means determines that the child node is entitled to initiate transmission of a message during a predetermined interval following the receipt of a message from another node.

3. The communications network apparatus of claim 1, further comprising transmission timeout means in said master node and in each of said plurality of subject nodes for aborting transmission of a message, said message comprising a plurality of predefined units of data transmitted serially, if a predefined timeout period has elapsed since transmission of the previous unit of data of said message.

4. The communications network apparatus of claim 1, wherein at least one of said subject nodes is connected, by one of said plurality of connections, to a child node of said subject node.

5. The communications network apparatus of claim 4, wherein:
said master node comprises means for initiating a broadcast message to be transmitted to every subject node in said network; and
each subject node in said network being connected by at least one of said connections to a child node comprises means for re-transmitting said broadcast message to each node which is a child node of said subject node.

6. The communications network apparatus of claim 4, further comprising transmission timeout means in said master node and in each of said plurality of subject nodes for aborting transmission of a message, said message comprising a plurality of predefined units of data transmitted serially, if a predefined timeout period has elapsed since transmission of the previous unit of data of said message.

7. The communications network apparatus of claim 1, wherein said subject nodes comprise means for monitoring the status of one or more devices and reporting said status to said master node.

8. The communications network apparatus of claim 1, wherein said serial data signal carrier is a pair of wires running between said pair of nodes.

9. A subject node in a communication network, wherein said network comprises a master node, a plurality of subject nodes and a plurality of connections running between nodes, each said connection comprising a single serial data signal carrier connecting a pair of nodes, wherein one of said pair of nodes is a parent node with respect to the other of said pair of nodes, and the other of said pair of nodes is a child node with respect to said parent node, wherein said plurality of connections connect said master node and said plurality of subject nodes in a tree configuration, said tree having said master node at its root, wherein each of said plurality of subject nodes is connected to one or more nodes, one and only one of which is its parent, said subject node comprising:
means for coupling at least one of said plurality of connections to said subject node;
means for transmitting and receiving messages comprising serial data on said connection coupled to said subject node;
end of message detection means for determining that a message being received has ended, wherein said end of message detection means determines that a message has ended when no more serial data is received on said connection for a predetermined timeout period;
collision avoidance means for determining which node of the pair of nodes connected by said connection is entitled to initiate transmission of a message on said connection, wherein said means permits said child node to initiate transmission of a message to its parent only during a predefined interval following the occurrence of a predefined event, and said means prevent said parent node from transmitting a message to said child during said predefined interval.

10. The subject node in a communications network of claim 9, further comprising transmission timeout means for aborting transmission of a message, said message comprising a plurality of predefined units of data transmitted serially, if a predefined timeout period has elapsed since transmission of the previous predefined unit of data in said message.

11. The subject node in a communications network of claim 9, wherein said serial data signal carrier is a pair of wires running between said pair of nodes.

12. The subject node in a communications network of claim 9, wherein said collision avoidance means permits said subject node to initiate transmission of a message to its parent only during a predefined interval following the receipt of a message from said parent.

13. The subject node in a communications network of claim 12, further comprising transmission timeout means for aborting transmission of a message, said message comprising a plurality of predefined units of data transmitted serially, if a predefined timeout period has elapsed since transmission of the previous predefined unit of data in said message.

14. The subject node in a communications network of claim 13, further comprising means for monitoring power availability status of a device in a computer system.

15. The subject node in a communications network of claim 13, further comprising means for receiving a program for executing in said subject node from said network.

16. The subject node in a communications network of claim 9, further comprising means for transmitting and receiving messages comprising serial data on at least two of said plurality of connections, wherein at least one of said plurality of connections runs to a child node of said subject node.

17. The subject node in a communications network of claim 16, further comprising transmission timeout means for aborting transmission of a message, said message comprising a plurality of predefined units of data transmitted serially, if a predefined timeout period has elapsed since transmission of the previous predefined unit of data in said message.

18. The subject node in a communications network of claim 16, wherein:
said master node comprises means for initiating a broadcast message to be transmitted to every node in said network other than said master node; and
said subject node comprises means for re-transmitting said broadcast message to each node which is a child node of said subject node.

19. The subject node in a communications network of claim 18, further comprising:
means for broadcasting a message to a plurality of child nodes attached to said subject node simultaneously; and
means for ignoring responsive messages received from said child nodes when said responsive messages are received in response to a message which is broadcast to a plurality of child nodes simultaneously.

20. The subject node in a communications network of claim 18, further comprising means for receiving a program for executing in said subject node from said network.

21. The subject node in a communications network of claim 18, further comprising means for monitoring power availability status of a rack used for housing devices in a computer system.

22. A method in a subject node for communicating betwen nodes in a network, wherein said network comprises a plurality of nodes and a plurality of connections running between nodes, each said connection comprising a single serial data signal carrier connecting a pair of nodes, wherein one of said pair of nodes is a parent node with respect to the other of said pair of nodes, and the other of said pair of nodes is a child node with respect to said parent node, wherein said plurality of connections connect said plurality of nodes in a tree configuration, said tree having a master node at its root, wherein said subject node is not said master node, and wherein each of said plurality of nodes other than said master node is connected to one or more nodes, one and only one of which is its parent, said method comprising the steps of:

waiting in idle mode for a message from another node of said network, wherein said subject node is enabled to receive data on said network while performing said step of waiting in idle mode but does not transmit data on said network while performing said step of waiting in idle mode;

resetting an end of message timer whenever a predefined unit of data is received from another node of said network;

predetermining that a message has ended when said end of message timer times out;

setting a process timer for response to said message when said message has ended;

processing a responsive message to said message; and transmitting said responsive message to the parent node of said subject node if said process timer has not timed out.

23. The method of claim 22, wherein said step of transmitting a responsive message comprises the steps of:

resetting a transmit timer whenever a predefined unit of data is transmitted to said parent node; and aborting transmission of said message if said transmit timer times out before said message has been transmitted in its entirety.

* * * * *